(12) United States Patent
Douglas (10) Patent No.: US 10,482,455 B2
(45) Date of Patent: Nov. 19, 2019

(54) PRE-PROVISIONED WEARABLE TOKEN DEVICES

(71) Applicant: CAPITAL ONE SERVICES, LLC, Mclean, VA (US)

(72) Inventor: Lawrence Douglas, Mclean, VA (US)

(73) Assignee: Capital One Services, LLC, McLean, VA (US)

( * ) Notice: Subject to any disclaimer, the term of this patent is extended or adjusted under 35 U.S.C. 154(b) by 848 days.

(21) Appl. No.: 15/142,994

(22) Filed: Apr. 29, 2016

(65) Prior Publication Data

US 2016/0321651 A1    Nov. 3, 2016

Related U.S. Application Data

(60) Provisional application No. 62/155,681, filed on May 1, 2015.

(51) Int. Cl.
*G06Q 20/22* (2012.01)
*G06Q 20/32* (2012.01)
*G06Q 20/36* (2012.01)

(52) U.S. Cl.
CPC ....... *G06Q 20/3672* (2013.01); *G06Q 20/227* (2013.01); *G06Q 20/3278* (2013.01)

(58) Field of Classification Search
CPC ............. G06Q 20/227; G06Q 20/3227; G06Q 20/3278; G06Q 20/3672
USPC ......................................................... 235/492
See application file for complete search history.

(56) References Cited

U.S. PATENT DOCUMENTS

| | | | | |
|---|---|---|---|---|
| 2015/0287034 A1* | 10/2015 | Celikyilmaz | ........ | G06Q 10/087 705/28 |
| 2015/0294303 A1* | 10/2015 | Hanson | ................ | G06Q 20/346 235/379 |
| 2016/0071094 A1* | 3/2016 | Krishnaiah | .......... | G06Q 20/363 705/66 |

* cited by examiner

*Primary Examiner* — Toan C Ly
(74) *Attorney, Agent, or Firm* — Finnegan, Henderson, Farabow, Garrett & Dunner, LLP (57) ABSTRACT

Disclosed embodiments include methods, systems, and computer-readable media configured to, for example, enable parties conducting transactions to identify a financial institution and payment network for a financial account associated with a pre-provisioned payment token using existing payment protocols. The method may include receiving from a third-party device a request for funding account information that identifies a token that does not identify a financial service provider or a payment network. The method may further include accessing a database to retrieve token information associated with the token, the token information include a link account number that indicates a funding account, a financial service provider associated with the funding account, and a payment network, and user preferences associated with the token. The method may further include providing the link account number to the third-party device in response to the request for funding account information according to the one or more user preferences.

14 Claims, 9 Drawing Sheets

PRE-PROVISIONED WEARABLE TOKEN DEVICES

PRIORITY

This application claims priority to U.S. Provisional Application No. 62/155,681 filed May 1, 2015, the disclosure of which is hereby incorporated by reference in its entirety.

BACKGROUND

Many forms of mobile payments are available to consumers today. While traditional methods such as cash and credit cards remain popular, many consumers also use new forms of payment made available via electronic computing devices. For example, many devices contain near-field communication ("NFC") capability, which allows a payment to be initiated when the device is placed into close proximity with an NFC reader. The payment terminal obtains payment account information through the NFC reader and then communicates with an appropriate financial network or other back-end processing system to authorize the transaction.

Payment tokens are typically used to secure data processed by mobile devices equipped with NFC technology when conducting payment transactions with contactless payment cards, contactless payment terminals, and/or other NFC equipped cell phones. Beyond the underlying account number, merchants also typically consider the account provider (e.g., bank, credit card issuer, etc.) and payment network (e.g., VISA®, MasterCard®, etc.) indicated by the payment token when considering whether to authorize a transaction. But existing methods and devices for employing payment tokens typically require network connectivity to provision payment tokens with that information on the payment devices, and many types of payment devices do not provide the ability to receive data, including provisioning data.

Thus, payment tokens that are not generated for a specific customer and/or financial institution—such as pre-provisioned payment tokens included on payment devices produced by third-parties unaffiliated with a particular financial institution—do not identify the account provider and payment network. This is because this information will not become known until a user purchases the payment token (or payment device storing the payment token, as the case may be) and identifies a financial account to be associated with the payment token (e.g., when a user registers a payment device and payment token for use).

Accordingly, certain aspects of the disclosed embodiments provide methods and systems that enable parties to use any pre-provisioned payment tokens during a transaction to identify, in addition to a funding account number for processing a payment transaction, the account provider and payment network associated with the funding account number. Other aspects are also provided as disclosed below.

SUMMARY

Disclosed embodiments include methods, systems, and computer-readable media configured to, for example, enable parties conducting transactions to identify a financial institution and payment network for a financial account associated with a pre-provisioned payment token using existing payment protocols.

In one aspect, the disclosed embodiments include a system comprising a database configured to store a plurality of tokens, each token of the plurality of tokens associated with a user. The system may also comprise at least one network communication device, and a storage device comprising instructions. The system may further comprise at least one processor configured to execute the instructions to perform a method. The method may include receiving a request for funding account information from a third-party device, the request for funding account information identifying at least a token that does not identify a financial service provider or a payment network. The method may further include accessing the database to retrieve token information associated with the token identified in the request, the token information comprising at least (i) a link account number that indicates a funding account, a financial service provider associated with the funding account, and a payment network, and (ii) one or more user preferences associated with the token. The method may further comprise providing the link account number to the third-party device in response to the request for funding account information according to the one or more user preferences.

Aspects of the disclosed embodiments may include tangible computer-readable media that store software instructions that, when executed by one or more processors, are configured to and capable of performing and executing one or more of the methods, operations, or the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
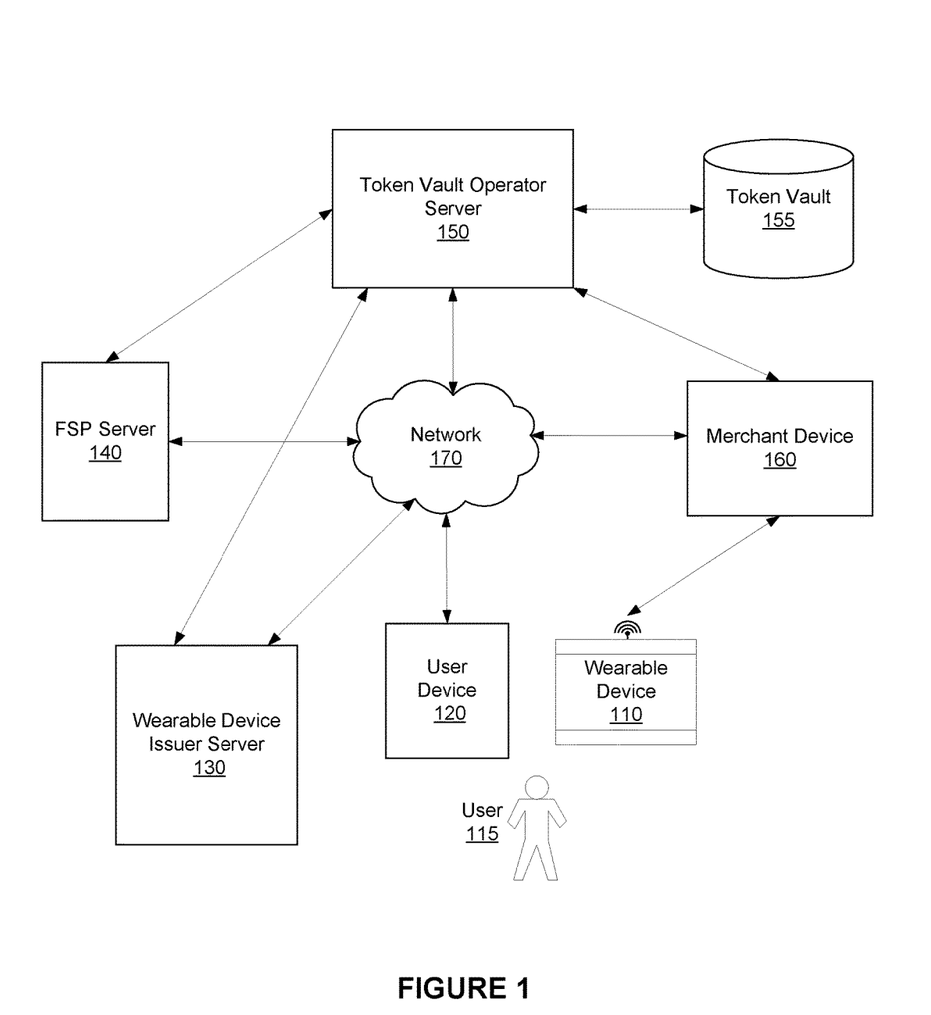
FIG. 1 is a block diagram of an exemplary system, consistent with disclosed embodiments.

FIG. 1 is a block diagram of an exemplary system 100 for performing one or more operations, consistent with the disclosed embodiments. In one embodiment, system 100 may include one or more wearable devices 110, one or more user devices 120, one or more wearable device issuer servers 130, one or more financial service provider (FSP) servers 140, one or more token vault operator servers 150, one or more token vaults 155, and/or network 170. Consistent with disclosed embodiments, user 115 may be associated with user device 120 and/or wearable device 110. The components and arrangement of the components included in system 100 may vary. Thus, system 100 may include other components that perform or assist in the performance of one or more processes consistent with the disclosed embodiments.

Components of system 100 may be computing systems configured to enable parties conducting transactions to identify a financial institution and payment network for a financial account associated with a pre-provisioned payment token (e.g., a secure software mechanism that may be used to authorize operations) using existing payment protocols, consistent with disclosed embodiments. As further described herein, components of system 100 may include one or more computing devices (e.g., computer(s), server(s), etc.), memory storing data and/or software instructions (e.g., database(s), memory device(s), etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with wearable device 110, user device 120, wearable device issuer server 130, financial service provider (FSP) server 140, token vault operator server 150, or token vault 155. In certain aspects, users may operate one or more components of system 100 to initiate and provide input for one or more operations consistent with the disclosed embodiments.

A financial service provider (not shown) may be an entity that provides, maintains, manages, or otherwise offers financial services. For example, financial service provider may be a bank, credit card issuer, or any other type of financial service entity that generates, provides, manages, and/or maintains financial service accounts for one or more cardholders. Financial service accounts may include, for example, credit card accounts, loan accounts, checking accounts, savings accounts, reward or loyalty program accounts, and/or any other type of financial service account known to those skilled in the art. Financial service provider include infrastructure and components that are configured to generate and/or provide financial service accounts such as credit card accounts, checking accounts, debit card accounts, loyalty or reward programs, lines of credit, or the like.

For example, a financial service provider may include one or more FSP servers 140. In one aspect, FSP servers 140 may be one or more computing devices configured to perform one or more operations consistent with disclosed embodiments. In one aspect, FSP servers 140 may be a desktop computer, a server, or any other type of computing device. FSP servers 140 may include one or more processors configured to execute software instructions stored in memory. The one or more processors may be configured to execute software instructions that when executed by a processor performs known Internet-related communication and financial service-based processes.

A merchant (not shown) may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities) may purchase, consume, use, etc. In one example, a merchant may be associated with a merchant brick and mortar location that a user (e.g., user 115) may physically visit in order to purchase a product or service. The merchant may also include back- and/or front-end computing components that store data and execute software instructions to perform operations consistent with disclosed embodiments, such as computers that are operated by employees of the merchant (e.g., back office systems, etc.).

The merchant may include and/or be associated with merchant device 160. Merchant device 160 may include one or more computing systems, such as server(s), desktop computer(s), point-of-sale device(s), etc., that are configured to execute stored software instructions to perform operations associated with a merchant, including one or more processes associated with processing purchase transactions, generating transaction data, generating product data (e.g., SKU data) relating to purchase transactions, etc. Merchant device 160 may perform one or more operations consistent with the disclosed embodiments. The disclosed embodiments are not limited to any particular configuration of merchant device 160. As one example, merchant device 160 may be a point-of-sale system like a cash register. Merchant device 160 may comprise functionality and/or hardware operable to receive wireless communications from wearable device 110 and/or user device 120. For example, merchant device 160 may be configured to utilize technologies such as NFC radio, radio frequency identification (RFID), infrared, electric field, magnetic fields, or other technologies, in order to initiate and/or process a purchase or other transaction.

Merchant device 160 may also generate and send token authorization requests to systems, such as token vault operator server 150 and/or token vault 155. For example, merchant device 160 may receive a token from wearable device 110 as part of a payment transaction for services and/or goods rendered, and merchant device 160 may send the token (along with other information) to token vault operator server 150 and/or token vault 155 requesting financial account information associated with the token with which to complete a payment transaction. Thus, merchant device 160 may also generate and send transaction requests to systems, such as FSP server 140. Such transaction requests may comply with ISO 8583. For example, upon receiving financial account information associated with the token, merchant device 160 may generate an ISO 8583 message to FSP server 140 indicating that an account holder would like to make a debit transaction for the purchase price of the rendered good or service.

Merchant device 160 may include a contactless payment terminal (not shown) comprising any known NFC device designed to communicate (directly or indirectly) with other components of system 100. For example, the contactless payment terminal (CPT) may be a point of sale (POS) terminal, automated teller machine (ATM), or any other device that is configured to communicate with NFC mobile devices (e.g., wearable device 110 and/or user device 120) to facilitate a financial transaction according to disclosed embodiments.

Wearable device 110 may be wearable computing devices configured to communicate with other components of system 100 to perform one or more processes consistent with disclosed embodiments. For example, wearable device 110 may include memory devices configured to store information (e.g., one or more tokens) that may be transmitted to a merchant device (e.g., merchant device 160) for use in processing a transaction.

Figure 2:
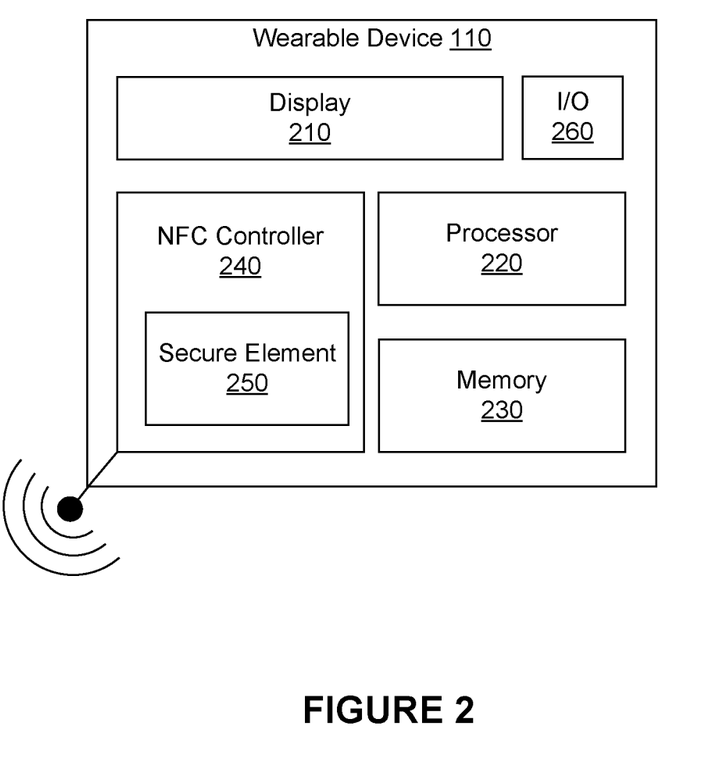
FIG. 2 is a diagram of an exemplary wearable device configuration, consistent with disclosed embodiments.

FIG. 2 depicts an exemplary wearable device 110, consistent with disclosed embodiments. In one embodiment, wearable device 110 may include components that may execute one or more processes to initiate a financial transaction by, for example, transmitting a token associated with a financial account to merchant device 160. As shown in FIG. 2, wearable device 110 may include a display 210, processor 220, a memory 230, an NFC controller 240 comprising at least a secure element 250, and/or an input/output (I/O) component 260.

Display 210 may be a device component configured to convey information to a user, such as user 115. For example, display 210 may be a screen display, one or more LED light(s), etc. In some embodiments, display 210 may be configured to display optical payment methods, such as token slots/tokens, or providing information to the user.

Processor 220 may include one or more known processing devices, from microcontrollers configured to process simple logic commands, such as PIC microcontrollers, MIPS microcontrollers, etc., to more powerful microprocessors including the Pentium™ or Xeon™ family manufactured by Intel™, the Turion™ family manufactured by AMD™, or any of various processors manufactured by Sun Microsystems. The disclosed embodiments are not limited to any type of processor(s) configured in wearable device 110.

Memory device 230 may include one or more storage devices configured to store information. For example, in some embodiments, memory device 230 may store instructions that may be executed by a processor, such as processor 220. Memory device 230 may store data that may reflect any type of information in any format that the system 100 may use to perform operations consistent with the disclosed embodiments.

In some embodiments, processor 220 may execute one or more programs stored by memory device 230. For example, processor 220 may execute a transaction program configured to provide a token stored in secure element 250 to a merchant device (e.g., a POS device) when user 115 operates wearable device 110 to complete a financial transaction.

NFC controller 240 may be a device with logic that is configured to execute NFC-related operations. Alternatively, NFC controller 240 may be software that is stored in memory device 230, or a separate memory device in wearable device 110. NFC controller 240 may operate and be configured according to architectures and designs known to one of ordinary skill in the art. In one embodiment, NFC controller 240 includes a secure element 250 providing an environment in which processes and data may be securely stored and/or executed. In other embodiments, secure element 250 may be separate from NFC controller 240, such as a separate embedded device in wearable device 110, such as a SIM/UICC card that functions as the secure element, or software located in memory 230 that may or may not be the same memory that hosts NFC controller 240. For example, secure element 250 may provide delimited memory for applications operating according to disclosed embodiments. In certain embodiments, secure element 250 may be configured and operate as known secure elements for NFC devices. For example secure element 250 may store applications, slot information, credentials (e.g., tokens), and/or other information associated with secure execution of applications.

Figure 3:
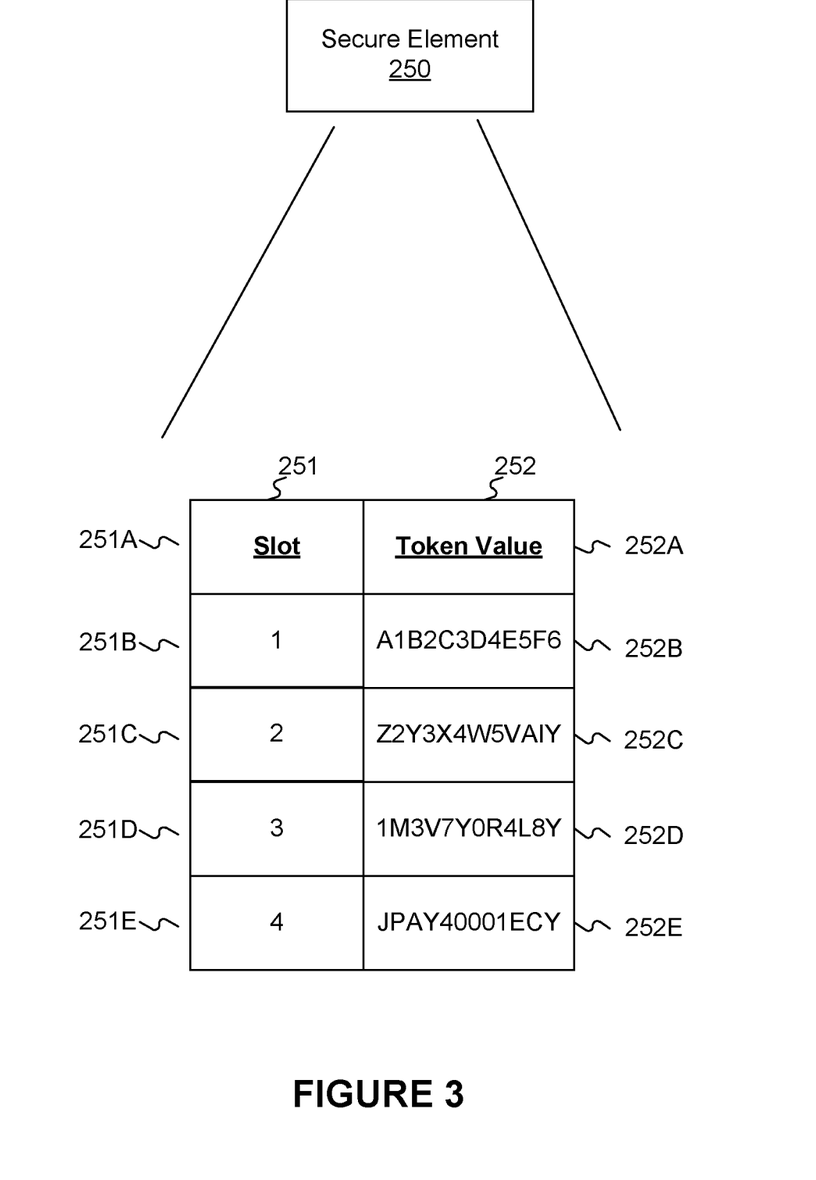
FIG. 3 is a diagram of exemplary data structure for storing data in memory of a wearable device, consistent with disclosed embodiments.

For example, as shown in FIG. 3, secure element 250 may comprise memory storing one or more token slots (fields 251) and token values (fields 252). For example, secure element may comprise five slots 251A-E corresponding to five token values 252A-E. According to some embodiments, each token value 252A-E may correspond to a different financial account of user 115 held with the financial service provider associated with FSP server 140. In other embodiments, one or more token values 252A-E may correspond to the same financial account of user 115 held with the financial service provider associated with FSP server 140. As discussed in more detail below, upon communicating with, e.g., merchant device 160, wearable device 110 may identify a slot 251A-D and transmit a corresponding token 252A-E to merchant device 160 that the underlying merchant may use to obtain a financial account associated with the token in token vault 115. In some embodiments, wearable device 110 may be preprogrammed with an active slot to use when communicating with a merchant device 160. In other embodiments, wearable device 110 may identify a slot 251 dynamically based on, for example, a rotating basis, or a command from another system 100 component (e.g., merchant device 160, FSP server 140, token vault operator server 150, etc.).

I/O devices 260 may also include one or more digital and/or analog devices that allow user 115 to interact with wearable device 110, such as a touch-sensitive area, buttons, or microphones. I/O devices 260 may also include one or more accelerometers to detect the orientation and inertia of wearable device 110. I/O devices 260 may also include other components known in the art for interacting with user 115, such as optical, magnetic, vibration, or other sensors capable of detecting interaction with wearable device 110 by user 115.

In some embodiments, wearable device 110 may be a passive device having no internal power supply. For example, wearable device 110 may draw power to operate from, for example, an NFC reader associated with merchant device 160. In other embodiments, wearable device 110 may be a semi-passive device having an internal power supply for operating circuitry of wearable device 110 but drawing power from, for example, an NFC reader associated with merchant device 160 in order to communicate. In still other embodiments, wearable device 110 may be an active device having an internal power supply capable of operating all aspects of wearable device 110.

Wearable device 110 may be any device configured to be worn or carried by a user, such as a user 115. For example, wearable device 110 may be incorporated into a wearable item such as a wristband, jewelry, eyeglasses, sunglasses, watch, piece of clothing (e.g., shirt, shoe, pants, jacket, etc.), etc., may include an attachment device (e.g., a clip) to allow it to be attached to a wearable item (e.g., belt), may be incorporated into an item that is normally carried by a user or held in the user's pocket (e.g., smartphone, wallet, keys), and the like. In some embodiments, wearable device 110 may be a component of or incorporated into a commercially available wearable computing device, such as Google Glass®, a smartwatch, etc.

User device 120 may be one or more computing devices configured to perform one or more operations consistent with disclosed embodiments. User device 120 may be a desktop computer, a laptop, a server, a mobile device (e.g., tablet, smart phone, etc.), or any other type of computing device. For exemplary purposes, aspects of the disclosed embodiments are described with reference to user device 120 as a mobile client device, such as a smart phone, tablet, or the like. As mentioned herein, however, the disclosed embodiments are not limited to such examples. For example, user device 120 could be a laptop, a desktop, or any other device.

User device 120 may include one or more processors configured to execute software instructions stored in memory, such as memory included in user device 120. User device 120 may include software that when executed by a processor performs known Internet-related communication, content display processes, and/or disclosed token vault processes for a user of user device 120. For instance, user device 120 may execute browser or related mobile display software that generates and displays interfaces including content on a display device included in, or in communication with, user device 120. User device 120 may be a mobile device that executes mobile device applications and/or mobile device communication software that allows user device 120 to communicate with components over network 170, and generates and displays content in interfaces via a display device included in user device 120. The disclosed embodiments are not limited to any particular configuration of user device 120. For instance, user device 120 may be a mobile device that stores and executes mobile applications that provide token vault functions offered by token vault operator server 150 and/or financial service-related functions offered by FSP server 140.

Wearable device issuer server 130 may be one or more devices associated with an entity (not shown) that manufactures, sells, promotes, or otherwise provides wearable devices, such as wearable devices 110. In some embodiments, wearable device issuer server 130 may communicate with user device 120, FSP server 140, and/or token vault operator server 150 to, for example, associate one or more financial accounts of user 115 in token vault 155 with one or more tokens stored in secure element 250 of wearable device 110.

Token vault operator server 150 may be one or more devices associated with an entity (not shown) that monitors and/or controls access to token vault 155. For example, token vault operator server 150 may be operated by VISA®, MasterCard®, or any other entity controlling a payment rail capable of facilitating a transaction from FSP server 140 for an account of user 115 to a merchant associated with merchant device 160. In other embodiments, token vault operator server 150 may be one or more devices associated with the issuer of wearable device(s) 110, a financial service provider, etc. Thus, in some embodiments, token vault operator server 150 may be part of wearable device issuer server 130, FSP server 140, etc.

Token vault operator server 150 may execute software that provides data used for generating and displaying interfaces, including content on a display device included in, or connected to, user device 120, a POS associated with merchant device 160, etc. In some embodiments, token vault operator server 150 may provide one or more web sites, online portals, application programming interfaces (APIs), etc., that are accessible by user device 120, FSP server 140, wearable device issuer server 130, and/or merchant device 160 over network 170. The disclosed embodiments are not limited to any particular configuration of token vault operator server 150.

Token vault(s) 155 may include one or more memory devices that store information and are accessed and/or managed through token vault operator server 150. By way of example, token vault(s) 155 may include Oracle™ databases, Sybase™ databases, or other relational databases or non-relational databases, such as Hadoop sequence files, HBase, or Cassandra. The databases or other files may include, for example, data and information related to generated token(s), token relationships to financial accounts of user(s) 115, financial records, purchase transaction data, etc. Systems and methods of disclosed embodiments, however, are not limited to separate databases.

In one aspect, token vault operator server 150 may include token vault(s) 155. Alternatively, token vault(s) 155 may be located remotely from the token vault operator server 150. Token vault(s) 155 may include computing components (e.g., database management system, database server, etc.) configured to receive and process requests for data stored in memory devices of token vault(s) 155 and to provide data from token vault(s) 155.

Figure 4:
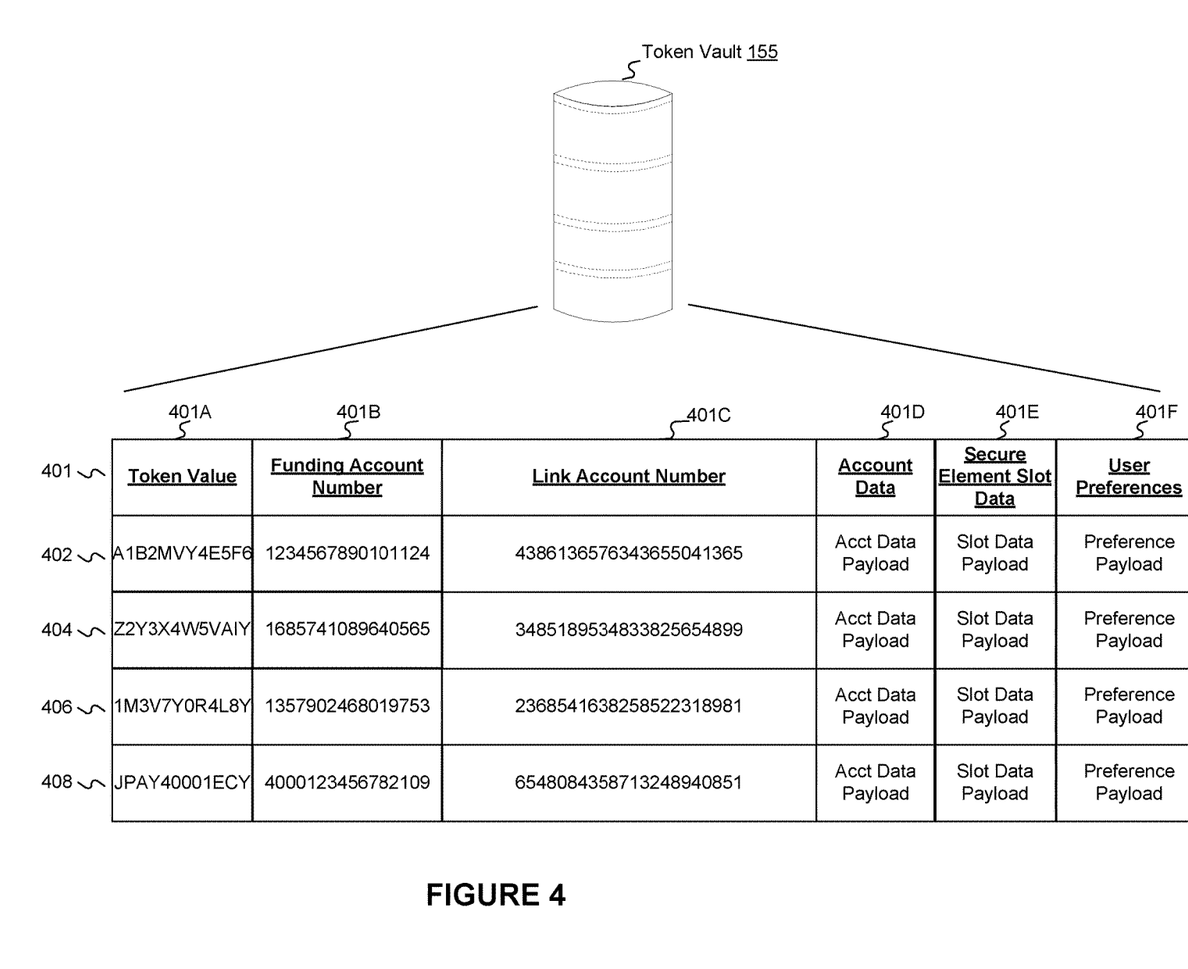
FIG. 4 is a diagram of exemplary data structure for storing data in a token vault, consistent with disclosed embodiments.

FIG. 4 is a diagram of exemplary information stored in token vault(s) 155, consistent with disclosed embodiments. In one aspect, token vault(s) 155 stores one or more tables that contain records 402, 404, 406, and 408. Each of records 402, 404, 406, and 408 contain one or more fields 401 (e.g., 401A, 401B, 401C, 401D, 401E, and 401F). The fields, records, and values therein in FIG. 4 are exemplary and are provided to illustrate embodiments of the disclosure.

For example, each record may contain field 401A, entitled for exemplary purposes as "Token Value." Field 401A may contain a unique token value. Token values may be generated, for example, by wearable device issuer server 130, token vault operator sever 150, or other components of system 100. For example, wearable device issuer server 130 may generate one or more token values and store the token value(s) in the secure element 250 when constructing wearable device 110. Wearable device issuer server 130 may transmit the generated token(s) to token vault 155 (via, e.g., token vault operator sever 150), which may be inserted into token vault(s) 155 as an entry under field 401A.

Each record may also contain field 401B, entitled for exemplary purposes as "Funding Account Number." Field 401B may contain an account number associated with a financial account of a user (e.g., user 115) issued by a financial service provider (e.g., associated with FSP server 140) for funding/receiving funds associated with a financial transaction. For example, consistent with disclosed embodiments, user 115 may purchase a wearable device 110 from an issuer of wearable devices and operate user device 120 to link with a financial account(s) of user 115 with one or more token(s) stored in secure element 250 of the wearable device 110. In response, token vault 155 may associate the identified token (which are stored under field 401A) with the financial account of user 115 by inserting the funding account number in a corresponding field 401B.

Each record may also contain field 401C, entitled for exemplary purposes as "Link Account Number." Field 401C may contain a "link account" number for linking at least the funding account number (field 401B) with the financial service provider and payment network associated with the funding account number. As discussed in more detail below, token vault operator server 150 may store the link account number at a field 401C and provide the link account number to an entity requesting account information associated with a token for processing a purchase transaction. Based on the link account number, the requesting entity may identify the funding account number, underlying financial institution, and associated payment network associated with the funding financial account before determining whether to complete the transaction.

Each record may also contain field 401D, entitled for exemplary purposes as "Account Data." Field 401D may contain data associated with the funding account number indicated in corresponding field 401B. For example, field 401D may indicate the financial institution providing the funding account and/or the payment network (Visa®, MasterCard®, AMEX®, etc.) associated with the funding account.

Each record may also contain field 401E, entitled for exemplary purposes as "Secure Element Slot Data." Field 401E may contain data associated with the slot(s) of a secure element 250. For example, field 401E may indicate the slot of secure element 250 in which tokens indicated in field 401A are stored in secure element 250 (e.g., one or more of slots 251A-D of FIG. 3). In some embodiments, only one slot 251 of secure element 250 may be active at a time (e.g., token vault 155 will only provide an account number associated with secure element 155 when the requesting party—e.g., merchant device 160—requests the account using the token stored in an active slot). Thus, field 401E may store data indicating, among other things, the number of slots available on a given secure element 250, as well as the active slot. In some embodiments, the active slot may rotate through available slots such that the active slot of a secure element 250 is predictable to both token vault 155 and secure element 250, but not unauthorized parties. In other embodiments, token vault 155 may indicate to secure element 250 (via, e.g., an NFC device at merchant device 160) which slot is active before providing a token to merchant device 160 as part of a purchase transaction with user 115.

Each record may also contain field 401F, entitled for exemplary purposes as "User Preferences." Field 401F may contain account token vault preferences of a user (e.g., user 115). For example, consistent with disclosed embodiments, user preferences may indicate which account from among a plurality of accounts to use based on set of predefined circumstances or settings. For example, multiple financial accounts may be associated with a token, and user preferences 401F may instruct token vault operator server 150 to return a first financial account for purchases made for a first merchant, a second financial account for transactions exceeding a predetermine amount, etc. Moreover, the user preferences may indicate that token vault operator server 150 should return the account number associated with the financial account that would provide a purchase discount, maximize rewards associated with a loyalty program, etc. In other embodiments, when each financial account is associated with a separate token, token vault operator server 150 may request the token value associated with the preferred account according to user preferences when presented with a request for a financial account number. User preferences 401F may further indicate that token vault operator server 150 should prompt merchant device 160 (e.g., a POS terminal) to request a PIN, biometrics, etc. for higher risk transactions (e.g., due to a higher risk associated with an new merchant, uncharacteristically high transaction amount, etc.). Token vault 155 may associate the identified token (which are stored under field 401A) with the user preferences by inserting the user preferences in a corresponding field 401F.

One of ordinary skill will understand that token vault 155 may contain other fields and/or additional types of data. For example, token vault 155 may contain information such as security codes (e.g., CVV, CVV2) associated with account numbers 401B, may contain expiration dates associated with account numbers 401B, may contain names on payment cards associated with account numbers 401B, etc. Moreover, while FIG. 1 depicts a single token vault 155, one of ordinary skill will understand that a plurality of token vaults 155 may be employed operated by the same and/or different components of system 100.

Network 170 may be any type of network configured to provide communications between components of system 100. For example, network 170 may be any type of network (including infrastructure) that provides communications, exchanges information, and/or facilitates the exchange of information, such as the Internet, a Local Area Network, wireless network (e.g., a Wi-Fi/802.11 network), NFC, magnetic fields, optical code scanner, infrared, or other suitable connection(s) that enables the sending and receiving of information between the components of system 100. In other embodiments, one or more components of system 100 may communicate directly through a dedicated communication link(s) (shown and not shown).

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, wearable device 110, user device 120, wearable device issuer server 130, FSP server 140, token vault operator server 150, or token vault 155 may constitute a part of components of system 100 other than those specifically described, or may constitute a part of multiple components of system 100 (i.e., a distributed system). Moreover, token vault operator server 155 and token vault 155 may be separate and distinct from other components of system 100 (as shown), or token vault operator server 155 and token vault 155 may be may be part another component of system 100, such as FSP server 140.

Figure 5:
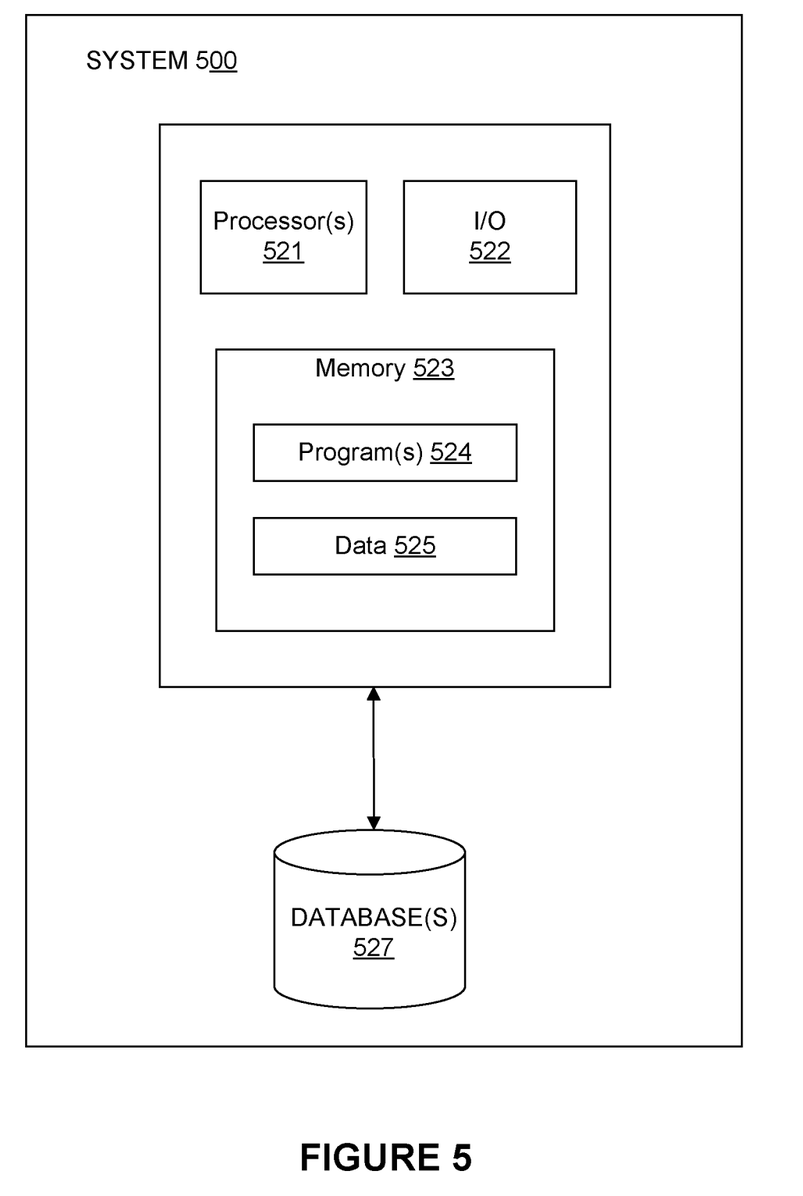
FIG. 5 is another exemplary system, consistent with disclosed embodiments.

FIG. 5 is a diagram of another exemplary system 500, consistent with disclosed embodiments. Variations of exemplary system 500 may be used by user device 120, wearable device issuer server 130, FSP server 140, token vault operator server 150, and/or token vault 155. In one embodiment, system 500 may comprise one or more processors 521, one or more I/O devices 522, and one or more memories 523. In some embodiments, system 500 may take the form of a server, general purpose computer, mainframe computer, or any combination of these components. In some embodiments, system 500 may take the form of a mobile computing device such as a smartphone, tablet, laptop computer, or any combination of these components. Alternatively, system 500 may be configured as a particular apparatus, embedded system, dedicated circuit, or the like based on the storage, execution, and/or implementation of the software instructions that perform one or more operations consistent with the disclosed embodiments.

Processor 521 may include one or more known processing devices, such as mobile device microprocessors or any various other processors. The disclosed embodiments are not limited to any type of processor(s) configured in system 500.

Memory 523 may include one or more storage devices configured to store instructions used by processor 521 to perform functions related to disclosed embodiments. For example, memory 523 may be configured with one or more software instructions, such as program(s) 524 that may perform one or more operations when executed by processor 521. The disclosed embodiments are not limited to separate programs or computers configured to perform dedicated tasks. For example, memory 523 may include a single program 524 that performs the functions of the user device 120, or program 524 may comprise multiple programs. Memory 523 may also store data 525 that is used by one or more programs. In certain embodiments, memory 523 may store software that may be executed by processor(s) 521 to perform one or more processes consistent with disclosed embodiments.

I/O devices 522 may be one or more devices configured to allow data to be received and/or transmitted by system 500. I/O devices 522 may include one or more digital and/or analog devices that allow system 500 to communicate with other machines and devices, such as other components of system 100. I/O devices 522 may also include one or more digital and/or analog devices that allow a user to interact with system 500, such as a touch-sensitive area, keyboard, buttons, or microphones. I/O devices 522 may also include other components known in the art for interacting with a user.

The components of system 500 may be implemented in hardware, software, or a combination of both hardware and software, as will be apparent to those skilled in the art. For example, although one or more components of system 500 may be implemented as computer processing instructions, all or a portion of the functionality of system 500 may be implemented instead in dedicated electronics hardware.

System 500 may also be communicatively connected to one or more database(s) 527. System 500 may be communicatively connected to database(s) 527 through network 170. Database 527 may include one or more memory devices that store information and are accessed and/or managed through system 500. By way of example, database(s) 527 may include Oracle™ databases, Sybase™ databases, or other relational databases or non-relational databases, such as Hadoop sequence files, HBase, or Cassandra. The databases or other files may include, for example, data and information related to the financial records, purchase transaction data, etc. Systems and methods of disclosed embodiments, however, are not limited to separate databases. In one aspect, system 500 may include database 527. Alternatively, database 527 may be located remotely from the system 500. Database 527 may include computing components (e.g., database management system, database server, etc.) configured to receive and process requests for data stored in memory devices of database(s) 527 and to provide data from database 527.

Figure 6:
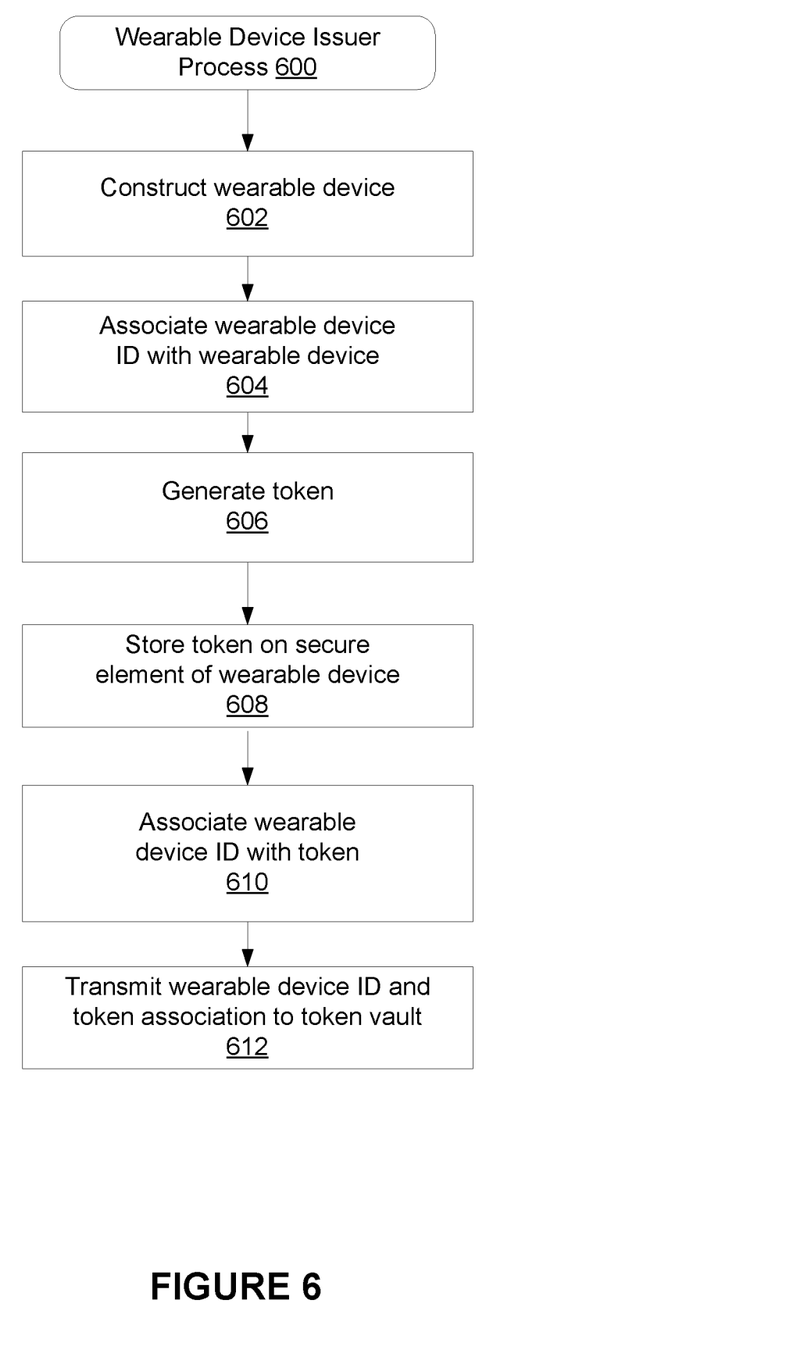
FIG. 6 is a flow chart of an exemplary wearable device issuer process, consistent with disclosed embodiments.

FIG. 6 is a flow chart of an exemplary wearable device issuer process 600, consistent with disclosed embodiments.

In step 602, wearable device 110 may be constructed. For example, a manufacturer may produce a wristband, jewelry, watch, money clip, wallet, key, keyfob or some other type of item that includes the components of wearable device 110 and may be worn or carried by user 115. In step 604, the wearable device 110 (or, more particularly, secure element 250 of wearable device 110) may be associated with a wearable device ID. For example, wearable device issuer server 130 may generate a wearable device ID and associate it with the constructed wearable device 110. One or more tokens may also become generated (step 606) and stored on secure element 250 (step 608). In some embodiments, wearable device issuer server 130 may generate the one or more tokens. One of ordinary skill in the art, however, would understand that systems associated with other entities of system 100, such as token vault operator server 150 or FSP server 140, may generate the tokens that become stored in secure element 250. At step 610, wearable device issuer server 130 may associate the wearable device ID with the generated one or more tokens. Wearable device issuer server 130 may further transmit the wearable device ID, generated one or more tokens, and association information to token vault 155 (via, e.g., token vault operator server 150). In some embodiments, wearable device issuer server 130 may transmit the wearable device ID, generated one or more tokens, and association information in response to a request by token vault 155 upon a user 115 initiating a wearable device configuration process 700, as discussed below in more detail.

Figure 7:
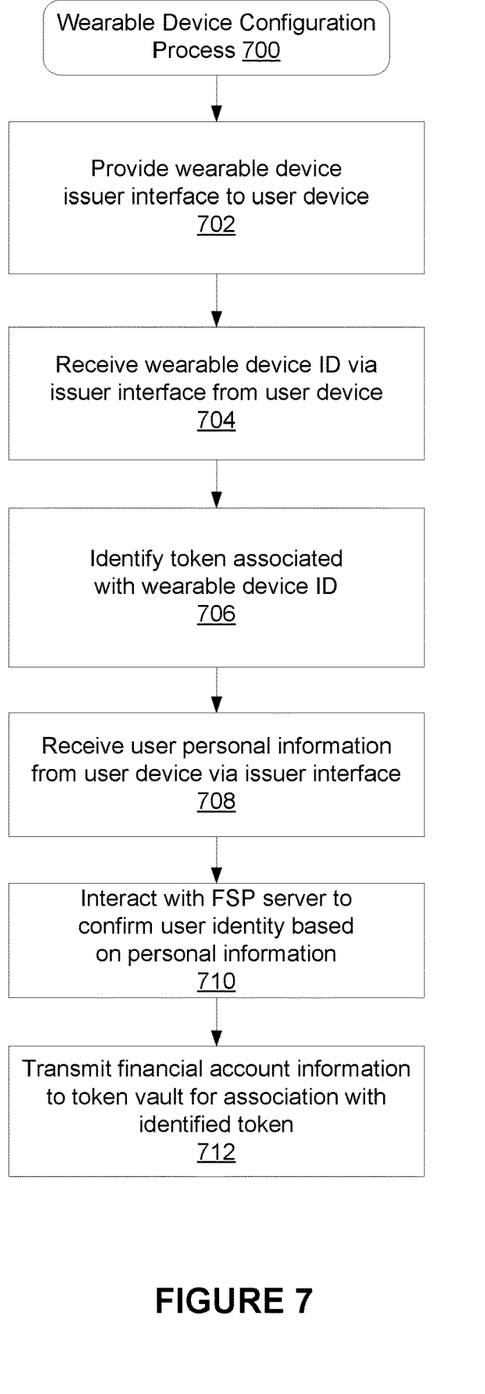
FIG. 7 is a flow chart of an exemplary wearable device configuration process, consistent with disclosed embodiments.

FIG. 7 is a flow chart of an exemplary wearable device configuration process 700, consistent with disclosed embodiments. For ease of discussion, process 700 may be discussed from the perspective of wearable device issuer server 130. It should be understood, however, that other components of system 100—such as token vault operator server 150—may execute one or more steps of process 700.

At step 702, wearable device issuer server 130 may provide one or more interface(s) to user device 120. For example, user 115 may purchase wearable device 110 and operate user device 120 to access a web site, online portal, API, etc. provided by wearable device issuer server 130 in order to activate wearable device 110 for use in financial transactions. At step 704, wearable device issuer server 130 may receive a wearable device ID from user device 120 via the provided interface(s). Based on the received wearable device ID, wearable device issuer server 130 may identify one or more tokens stored on secure element 250 of the wearable device 110 associated with the received wearable ID (step 706). Wearable device issuer server 130 may also receive user personal information from the user device 120 via the provided interface (step 708). For example, wearable device issuer server 130 may receive personal information including, but not limited to, user 115's name, address, social security number, phone numbers, financial account numbers, access credentials to one or more financial accounts, and the like. For example, user 115 may operate user device 120 to provide wearable device issuer server 130 with an indication as to which financial accounts user 115 would like to associate with the one or more tokens identified in step 706. In some embodiments, at step 710, wearable device issuer server 130 may interact with one or more other components of system 100—such as FSP server 140—to authenticate user 115 or otherwise confirm the identify and provided personal information provided by user 115 operating user device 120. At step 712, wearable device issuer server 130 may transmit the received financial account information to token vault 155 for association with the provided wearable device ID and associated tokens (e.g., the tokens associated with the wearable device ID at step 610/612).

Figure 8:
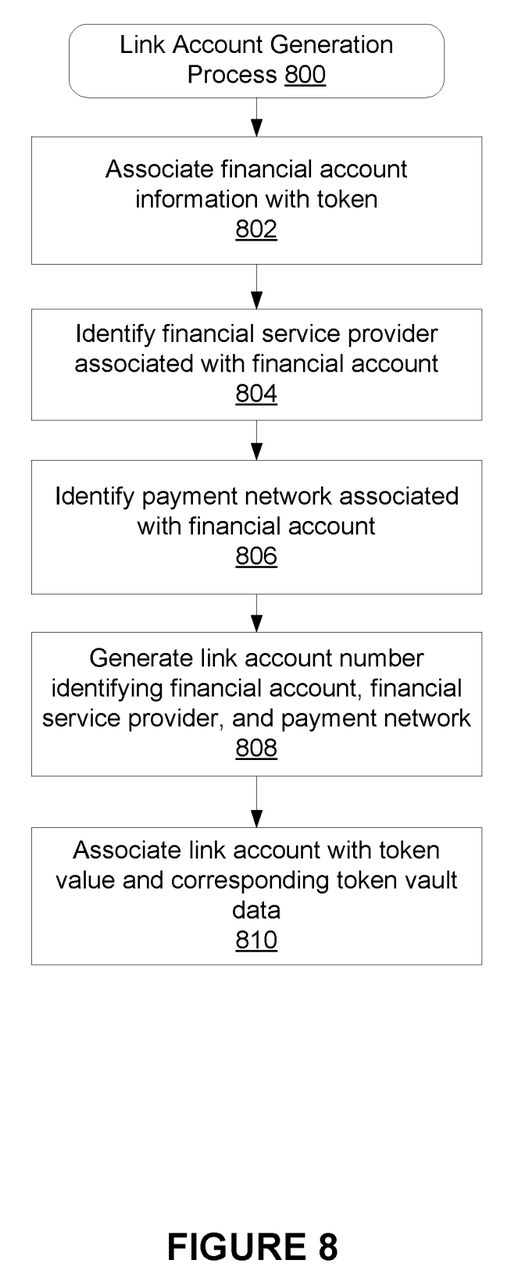
FIG. 8 is a flow chart of an exemplary link account generation process, consistent with disclosed embodiments.

FIG. 8 is a flow chart of an exemplary link account generation process 800, consistent with disclosed embodiments. For ease of discussion, process 800 may be discussed from the perspective of token vault operator server 150 and token vault 155. It should be understood, however, that other components of system 100—such as FSP server 140—may execute one or more steps of process 800.

At step 802, token vault operator server 150 may associate financial account information with a token. For example, in response to receiving financial account information associated with an token identified in step 712, token vault operator server 150 may associated the received financial account information with the identified token by, for example, by inserting the received financial account information in the field 401B corresponding to the identified token stored in field 401A.

Token vault operator server 150 may further identify the financial service provider associated with the received account (step 804). For example, token vault operator server 150 may identify the financial service provider based on the received account number and/or the customer personal information received at step 708.

At step 806, token vault operator server 150 may also identify a payment network (e.g., Visa®, MasterCard®, AMEX®, etc.) associated with the financial account. For example, token vault operator server 150 may identify the payment network based on the received account number and/or the customer personal information received at step 708.

Token vault operator server 150 may also, at step 808, generate a link account number indicating at least the financial account number (e.g., the financial account number identified in the financial account information received by the token vault 155 for association with an identified token identified in step 712), the financial service provider identified at step 804, and the payment network identified at step 806.

At step 810, token vault operator server 150 may associate the generated link account number with the token and account number of step 802. For example, token vault operator server 150 may store the link account number at a field 401C corresponding to the field 401A of the token and associated field 401B of the funding account number. Thus, token vault operator server 150 may provide the link account number to an entity (e.g., merchant device 160) requesting account information associated with a token for processing a purchase transaction, thereby allowing the requesting entity to identify the funding account number, as well as the underlying financial institution and payment network associated with the funding financial account, before determining whether to complete the transaction.

Figure 9:
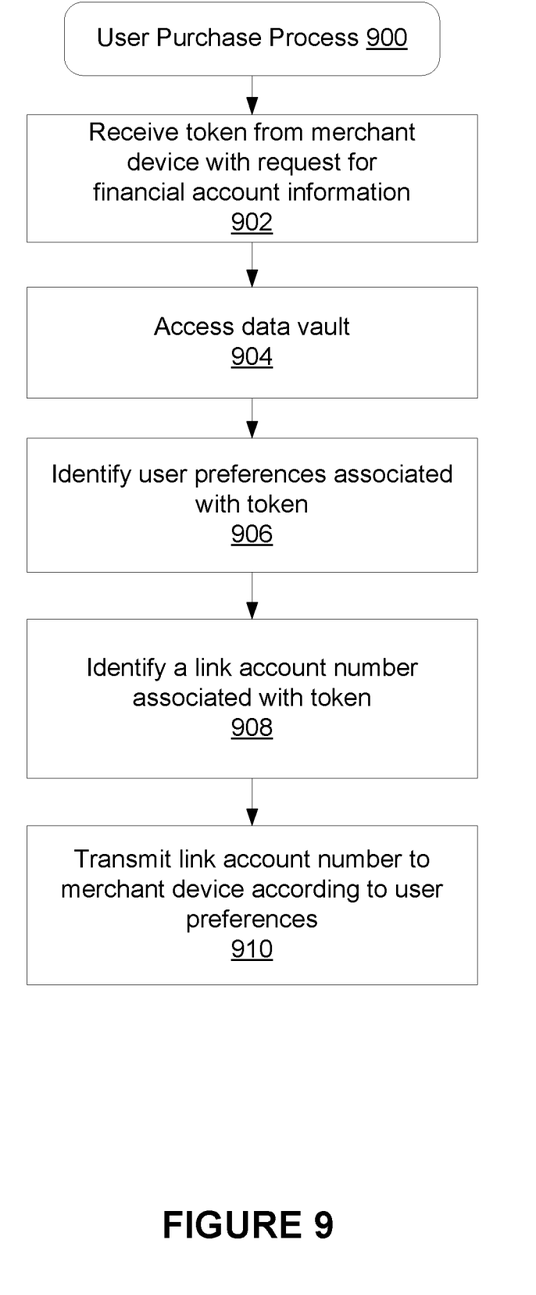
FIG. 9 is a flow chart of an exemplary user purchase process, consistent with disclosed embodiments.

FIG. 9 is a flow chart of an exemplary user purchase process 900, consistent with disclosed embodiments. For ease of discussion, process 900 may be discussed from the perspective of token vault operator server 150 and token vault 155. It should be understood, however, that other components of system 100—such as FSP server 140—may execute one or more steps of process 900.

At step 902, token vault operator server 150 may receive a request for financial account information associated with a token. For example, user 115 may present wearable device 110 during checkout at a merchant associated with merchant device 160. Wearable device 110 may pass a token stored on secure element 250 to merchant device 160 via NFC controller 240, and merchant device 160 may, in turn, request the account number associated with the passed token in order to complete a financial transaction. At step 904, token vault operator server 150 may access token vault 155 to identify one or more fields (e.g., 401B-401F) associated with the received token.

At step 906, token vault operator server 150 may identify user preferences associated with the received token (e.g., user preferences stored at field 401F of data vault 155). At step 908, token vault operator server 150 may also identify a link account (e.g., a link account stored at field 401C of data vault 155).

At step 910, token vault operator server 150 may further transmit the identified link account number to the merchant device 160 requesting financial account information at step 902. Consistent with disclosed embodiments, token vault operator server 150 may provide the link account according the identified user preferences. For example, consistent with disclosed embodiments, the identified user preferences may indicate which link account from among a plurality of link accounts to use based on one or more predefined circumstances or settings. For example, multiple financial accounts may be associated with a token, and user preferences 401F may instruct token vault operator server 150 to return a first link account for purchases made for a first merchant, a second link account for transactions exceeding a predetermine amount, etc. Moreover, the user preferences may indicate that token vault operator server 150 should return the link account number associated with the funding financial account that would provide a purchase discount, maximize rewards associated with a loyalty program, etc. In other embodiments, when each link account number is associated with a separate token, token vault operator server 150 may request the token value associated with the preferred funding account according to user preferences when presented with a request for financial account information.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:
1. A system, comprising:
  a database configured to store a plurality of pre-provisioned, wearable device tokens;
  at least one network communication device;

a storage device comprising instructions; and at least one processor configured to execute the instructions to perform operations, comprising:

receiving a request for funding account information from a third-party device, the request for funding account information identifying one of the pre-provisioned tokens without identifying a financial service provider or a payment network;

accessing the database to retrieve token information associated with the pre-provisioned token identified in the request, the token information comprising at least (i) a plurality of link account numbers that each indicate a corresponding funding account, a corresponding financial service provider associated with the funding account, and a corresponding payment network, and (ii) one or more user preferences associated with the pre-provisioned token indicating which link account number from among the plurality of link account numbers to select based on the requesting third party or a transaction amount;

selecting one of the link account numbers based on at least one of the user preferences; and providing the selected link account number to the third-party device in response to the request for funding account information.

2. The system of claim 1, wherein the third-party device comprises a merchant device.

3. The system of claim 1, wherein the user preferences indicate when additional information is required at the third-party device based on a set of predefined settings.

4. The system of claim 1, wherein the identified pre-provisioned token comprises one of the pre-provisioned tokens that is received by the third-party device from a wearable device.

5. The system of claim 4, wherein the identified pre-provisioned token is received by the third-party device via near field communication.

6. A method, comprising:

receiving a request for funding account information from a third-party device, the request for funding account information identifying a pre-provisioned token stored in a database, the request not identifying a financial service provider or a payment network;

accessing the database to retrieve token information associated with the pre-provisioned token identified in the request, the token information comprising at least (i) a plurality of link account numbers that each indicate a corresponding funding account, a corresponding financial service provider associated with the funding account, and a corresponding payment network, and (ii) one or more user preferences associated with the pre-provisioned token that indicate which link account number from among the plurality of link account numbers to select based on the requesting third party or a transaction amount;

selecting one of the link account numbers based on at least one of the user preferences; and providing the selected link account number to the third-party device in response to the request for funding account information.

7. The method of claim 6, wherein the third-party device comprises a merchant device.

8. The method of claim 6, wherein the user preferences indicate when additional information is required at the third-party device based on a set of predefined settings.

9. The method of claim 6, wherein the identified pre-provisioned token comprises one of the pre-provisioned tokens that is received by the third-party device from a wearable device.

10. The method of claim 9, wherein the identified pre-provisioned token is received by the third-party device via near field communication.

11. A non-transitory computer readable medium storing instructions that, when executed by one or more processors, cause the one or more processors to perform operations comprising:

receiving a request for funding account information from a third-party device, the request for funding account information identifying a pre-provisioned token stored in a database, the request not identifying a financial service provider or a payment network;

accessing the database to retrieve token information associated with the pre-provisioned token identified in the request, the token information comprising at least (i) a plurality of link account numbers that each indicate a corresponding funding account, a corresponding financial service provider associated with the funding account, and a corresponding payment network, and (ii) one or more user preferences associated with the pre-provisioned token that indicate which link account number from among the plurality of link account numbers to select based on the requesting third party or a transaction amount;

selecting one of the link account numbers based on at least one of the user preferences; and providing the selected link account number to the third-party device in response to the request for funding account information.

12. The non-transitory computer readable medium of claim 11, wherein the third-party device comprises a merchant device.

13. The non-transitory computer readable medium of claim 11, wherein the user preferences indicate when additional information is required at the third-party device based on a set of predefined settings.

14. The non-transitory computer readable medium of claim 11, wherein the identified pre-provisioned token comprises one of the pre-provisioned tokens that is received by the third-party device from a wearable device.

* * * * *